(No Model.)
F. D. TORRE.
BEE HIVE.
No. 256,932. Patented Apr. 25, 1882.
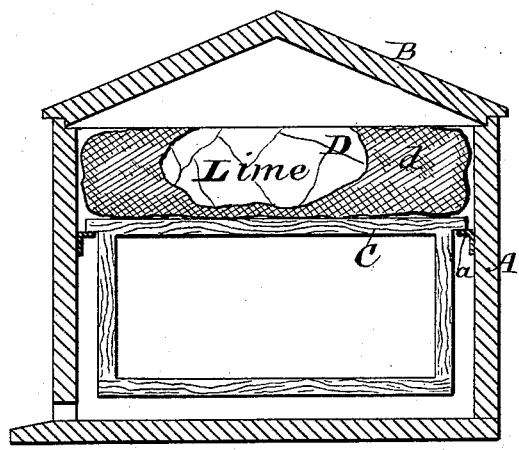
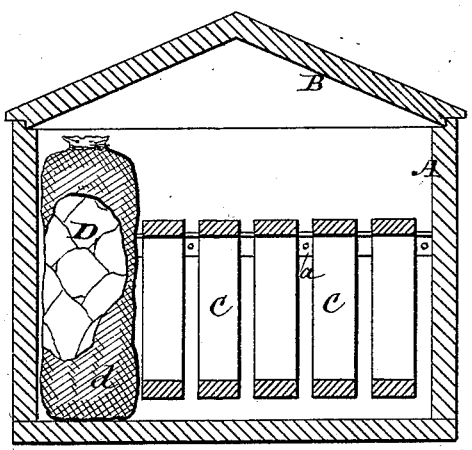
Witnesses
W. B. Masson
C. C. Shepherd.
Inventor.
Frank Della Torre
by E. E. Masson
atty

United States Patent Office.

FRANK DELLA TORRE, OF BALTIMORE, MARYLAND.

BEE-HIVE.

SPECIFICATION forming part of Letters Patent No. 256,932, dated April 25, 1882.

Application filed February 25, 1882. (No model.)

*To all whom it may concern:*

Be it known that I, FRANK DELLA TORRE, a citizen of the United States, residing at Baltimore, in the county of Baltimore and State of Maryland, have invented certain new and useful Improvements in the Art of Protecting Bees against Disease, of which the following is a specification.

My improvement relates to the art of protecting bees against disease, as well as against dampness, foul gases, and atmospheric low temperatures; and the objects of my improvements are to provide bee-hives with a substance that will purify the atmosphere of the hive, absorb the dampness and foul gases found therein, and increase the temperature within the hive during the winter. I attain these objects by means of quicklime secured in canvas bags or other suitable finely-perforated or open receivers placed within the hive and applied most generally as a cushion or cover over the brood-nest; but its location within the hive may vary, according to the form of the hive.

The accompanying drawings show my invention applied to one of the simplest of bee-hives now in use, Figure 1 representing a longitudinal vertical section, and Fig. 2 a transverse vertical section.

In said drawings, A represents the hive, and B its cover. To the inside of the walls are secured on two sides small shelves *a*, upon which are resting the ends of the comb-frames C in the usual manner; and upon the top edge of said frames, as shown in Fig. 1, is placed (in the latter part of the autumn of the year) a bag or cushion, *d*, containing the quicklime D, it being common to remove some of the comb-frames in the fall of the year and place a division-board within the hive, as the bees do not occupy the whole interior during the winter, but remain clustered together. I have also used the lime bag or cushion as a division-board, and secured it within the hive, between one of its walls and the remaining comb-frames, as shown in Fig. 2. When hives are provided with a wire-screen floor above its bottom the lime may be placed in a drawer under said wire floor, and be thus open to contact with the air within the hive without interfering with the bees or their working.

I have practically tested this preventive against bee-disease and found it very effective and not injurious. The general belief has heretofore been that many bees were killed in winter by bacteria, as well as by animal and vegetable parasites; but from my observations, continued for years, I believe their death is mainly produced by disease caused by dysentery, dampness, and foul gases. The dampness heretofore nearly always found in hives causes the pollen (gathered to feed the young in the early spring) to ferment and rot, and this undigestible food (for full-grown bees) causes the latter when feeding upon it to swell, become sick, and die, as they cannot fly during the winter to evacuate it. By using quicklime within the hive, or in such manner that the air within said hive is in contact with the lime through its open meshed covering, the dampness caused by the breathing of the bees is absorbed, and not only the dampness, but the carbonic acid produced at the same time, quicklime being a well-known absorbent of dampness, carbonic acid, and sulphureted hydrogen. The air of the hive being thus dried and chemically purified, the gathered pollen retains its healthy properties, and the bees pass the winter safely, the lime, by its gradual absorption of water, throwing off a corresponding amount of heat within the hive. As soon as the winter is over the bag or cushion of lime is removed and the interior of the hive is arranged in condition for the bees to make new honey-comb and honey.

I am aware that lime has been used as a whitewash upon the exterior of bee-hives, and that plaster-of-paris has been used as an external coating for the same. I am also aware that the properties of quicklime as an absorbent of moisture and gases are well known; and I do not claim broadly the use of lime for these purposes; but

What I claim, and desire to secure by Letters Patent, is—

1. A bee-hive provided with bags or cushions containing quicklime or lime partly slaked, substantially as and for the purposes set forth.

2. A bee-hive provided with quicklime or lime partly slaked, located in its interior, substantially as and for the purposes set forth.

FRANK DELLA TORRE.

Witnesses:
 E. E. MASSON,
 C. C. SHEPHERD.